UNITED STATES PATENT OFFICE.

MAX ALBERT KUNZ, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE COMPOUNDS AND PROCESS OF MAKING THEM.

1,058,604.  Specification of Letters Patent.  Patented Apr. 8, 1913.

No Drawing.   Application filed May 20, 1911.   Serial No. 628,552.

*To all whom it may concern:*

Be it known that I, MAX ALBERT KUNZ, Ph. D., chemist, citizen of the Swiss Republic, residing at Mannheim, Germany, have invented new and useful Improvements in Anthracene Compounds and Processes of Making Them, of which the following is a specification.

I have found that certain derivatives of dianthraquinonyl which contain negative substituents, namely one or more halogen atoms or nitro groups, can be condensed with salts, or esters, of amino-aryl-carboxylic acids, and that compounds containing carboxy groups can be obtained. According to the number of halogen atoms or nitro groups in the dianthraquinonyl compound and the conditions under which the reaction is carried out, either one residue or more than one residue of the amino-aryl-carboxylic acid can be introduced. Those of the carboxy-amino-dianthraquinonyl compounds produced which contain the carboxylic acid group in the ortho position to the nitrogen atom can be acted upon by suitable condensation agents, so that ring formation takes place, an acridone ring being formed, and if more than one such orthocarboxy residue has been introduced into the dianthraquinonyl residue more than one corresponding acridone ring can be produced. If the negatively substituted dianthraquinonyl compound which is used in carrying out the aforesaid process can undergo further ring formation, such for instance as is possible in the case of the formation of the pyranthrone complex from 2.2'-dimethyl-1.1'-dianthraquinonyl itself (see the specification of British Patent No. 14,578 of 1905 (see also *Berichte der Deutschen Chemischen Gesellschaft*, vol. 43, p. 347), this ring formation can be effected either before, or after, or at the same time as, the formation of the acridone ring, according to the conditions under which the reaction is carried out. If, in the production of the intermediate compounds, other than ortho-carboxylic acid derivatives be employed, only this ring formation, and not the acridone ring formation will take place.

In some cases, the two different ring formations can be effected at the same time by the same condensation agent and in the cases where the rings are formed one after the other, either the same or a different condensation agent can be employed. It is sometimes possible to effect the condensation of the amino-aryl-carboxylic acid with the dianthraquinonyl compound and the further ring formation in one operation.

After the ring formation has taken place, the products can be used directly as vat coloring matters, or they can be converted into their sulfoacids and then be employed for dyeing wool.

The following examples will serve to illustrate how this invention can be carried into practical effect, but my invention is not confined to these examples. The parts are by weight.

Example 1: Boil together, for three hours, five parts of 4.4'-dichlor-2.2'-dimethyl-1.1'-dianthraquinonyl, seventy-five parts of nitrobenzene, four parts of potassium anthranilate, and half a part of copper oxid. When the mixture is cold, filter off and wash the product with alcohol, dilute acid, and water. The 4.4'-dianilido-2.2'-dimethyl-1.1'-dianthraquinonyl-dicarboxylic acid is easily soluble in dilute alkali the solution being of a violet color, and by acid it is precipitated from this solution in the form of violet colored flakes. It yields an olive-green solution in concentrated sulfuric acid. It is possible that the product of this example possesses a constitution corresponding to the formula

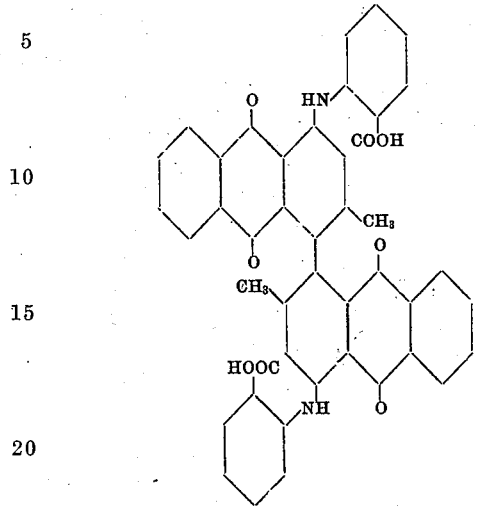

Example 2: Boil together for thirty minutes forty parts of 2.4.2′.4′-tetrabrom-1.1′-dianthraquinonyl, five hundred parts of nitrobenzene, twenty-two parts of potassium anthranilate, ten parts of calcined sodium carbonate, and two parts of copper oxid. Then take up the melt with water, distil off the nitrobenzene with steam, and filter the residue. On extracting this residue with boiling water and precipitating by means of acid, dibrom-1.1′-dianthraquinonyl-dianthranilic acid can be obtained in a pure condition. It yields an olive-green solution in concentrated sulfuric acid and a violet-red sodium salt which is difficultly soluble in an excess of caustic soda solution. It is possible that the product of this example has a constitution corresponding to the formula

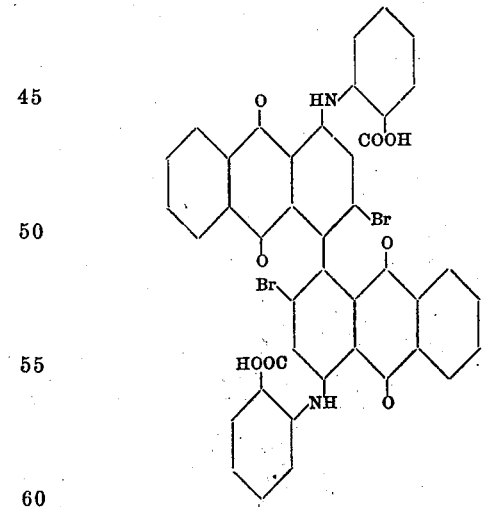

Example 3: Boil together, for thirty minutes, five parts of nitro-2.2′-dimethyl-1.1′-dianthraquinonyl (obtainable by nitrating 2.2′-dimethyl-1.1′-dianthraquinonyl in the cold with a mixture containing eighty-five per cent. of nitric acid and fifteen per cent. of sulfuric acid), one hundred parts of nitrobenzene, three and one-fifth parts of potassium anthranilate and five parts of potassium carbonate. Then distil off the nitrobenzene by means of steam and precipitate the condensation product from the aqueous solution by means of hydrochloric acid. It consists when dry of a brownish black powder which is easily soluble in dilute caustic soda solution with a brown color. Its solution in concentrated sulfuric acid is reddish violet.

Example 4: Dissolve one part of 2.2′-dimethyl - 1.1′ - dianthraquinonyl - 4.4′-dianthranilic acid in from eight to ten parts of ninety-seven per cent. sulfuric acid and heat the solution on the water-bath until the said solution which was olive-green has become deep red. This takes place after a few minutes' heating. After about a quarter of an hour, pour the mixture on to ice and water, and filter it and wash the product until it is neutral. It is a violet colored powder which is difficultly soluble in the usual organic solvents. With alkaline hydrosulfite it yields a red vat which dyes cotton violet shades. It is possible that the product of this example has a constitution corresponding to the formula

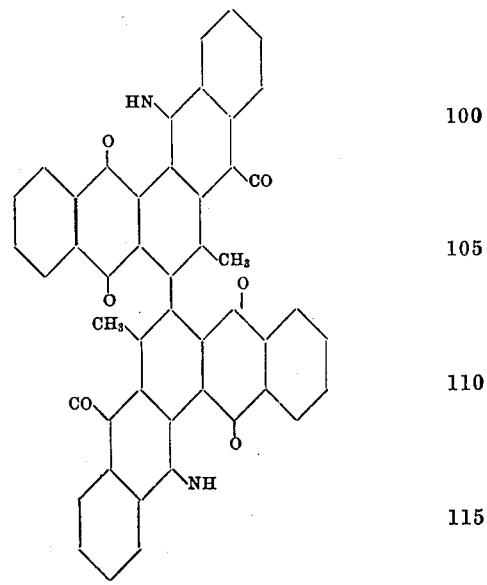

Example 5: Introduce thirty parts of 2.2′-dimethyl-1.1′-dianthraquinonyl-4.3.4′.3′-diphenylacridone (prepared according to the foregoing Example 4) into a solution of one hundred parts of caustic potash in eighty parts of absolute alcohol, while maintaining the temperature at from one hundred and thirty to one hundred and forty degrees centigrade. Then heat the whole for one hour at from one hundred and forty-five to one hundred and fifty degrees centigrade. When the melt is cold, dissolve it in water and blow air through the solution until the coloring matter is precipitated. It is a dark brown-violet powder which yields a red vat in alkaline hydrosulfite, which vat colors cotton red shades which, upon washing, are converted into brown-violet shades. It is possible that the product of this example has a constitution corresponding to the formula

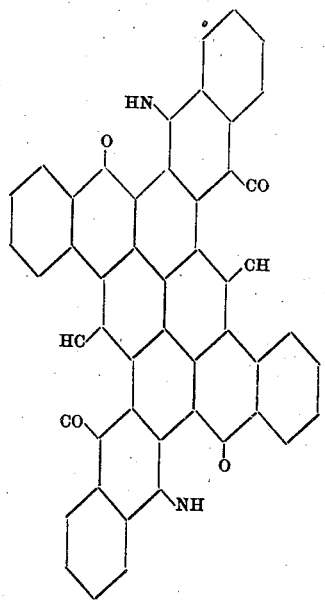

Now what I claim is:—

1. The process of producing coloring matter of the anthracene series by treating with a condensing agent an ortho-carboxy-aryl-amino-dianthraquinonyl compound.

2. The process of producing coloring matter of the anthracene series by treating a carboxy-aryl-amino-2.2′-dimethyl-dianthraquinonyl compound with a condensing agent.

3. The process of producing coloring matter of the anthracene series by treating an ortho-carboxy-aryl-amino-2.2′-dimethyl-dianthraquinonyl compound with a condensing agent.

4. As new articles of manufacture the coloring matters of the anthracene series which can be obtained by treating an ortho-carboxy-aryl-amino-dianthraquinonyl compound with a condensing agent, which coloring matters contain at least one acridone ring and consist when dry of violet powders, are insoluble in water and in dilute acids and alkalis, but are soluble in concentrated sulfuric acid with a reddish color, and in alkaline hydrosulfite forming reddish vats which dye cotton from red to violet shades of excellent fastness.

5. As new articles of manufacture the coloring matters of the anthracene series which can be obtained by treating a carboxy-aryl-amino-2.2′-dimethyl-dianthraquinonyl compound with a condensing agent, which coloring matters contain both a pyranthrone complex and at least one acridone ring, are insoluble in dilute acids and alkalis, but are soluble in alkaline hydrosulfite yielding vats which dye cotton fast shades.

6. As a new article of manufacture the coloring matter of the anthracene series which can be obtained by treating 4.4′-di-ortho-carboxy-phenyl-amino-2.2′-dibrom-1.1′-dianthraquinonyl with a condensing agent, which coloring matter contains two acridone rings and consists when dry of a dark brown-violet powder which is insoluble in dilute acids and alkalis, but which yields a red solution in concentrated sulfuric acid, and a red vat with alkaline hydrosulfite, which vat dyes cotton brown-violet shades of excellent fastness.

In testimony whereof I have hereunto set my hand in the presence of two subscribing witnesses.

MAX ALBERT KUNZ.

Witnesses:
J. ALEC. LLOYD,
A. O. TITTMANN.